United States Patent Office 3,278,403
Patented Oct. 11, 1966

3,278,403
DIRECT AND SIMULTANEOUS PRODUCTION OF INORGANIC ALKALINE SALTS, CHLORINE AND CATHODIC PRODUCTS
Ugo Gardella, Giorgio Morandi, and Alberto Omacini, Milan, Italy, assignors to Soc. Edison-Settore Chimico, Milan, Italy
No Drawing. Filed July 10, 1962, Ser. No. 208,924
Claims priority, application Italy, Aug. 11, 1961, 14,695/61; Nov. 2, 1961, 19,763/61
5 Claims. (Cl. 204—91)

This invention relates to a process for the simultaneous production of inorganic alkali-metal salts and chlorine gas.

More specifically, it relates to the simultaneous electrolytic production of inorganic alkali-metal salts such as nitrates, sulphates, phosphates, and fluorides, as well as chlorine gas.

As is well known, in conventional processes for producing chlorine by electrolysis of aqueous alkali-metal chloride solutions, there is a concomitant production of caustic alkali, for which the market demand is no longer proportional to that of the halogen. In this connection, it is well known, in fact, that in the past few years the industry has turned toward producing chlorine by electrolysis of HCl solutions generally obtained as by-products of organic and inorganic processing.

It is, therefore, the object of this invention to limit the dependency of the production of chlorine upon that of caustic alkali in the electrolysis of alkali chlorides by keeping the chlorine cost within economically convenient and competitive limits, as compared to the processing methods used heretofore, by means of direct and simultaneous production of inorganic alkali-metal salts offering good marketing possibilities.

A further object of this invention is to provide, starting from alkaline chlorides, a number of alkali-metal salts such as nitrates, phosphates and fluorides which are in large demand and have widespread applications.

Processes which starting from alkaline chlorides and mineral acids, produce chlorine and alkaline salts of the mineral acid used via a succession of processing stages are already known.

Thus, for example, the conversion of alkaline chlorides to chlorine and sulphates and bisulphates required the treatment of the alkali chloride in high-temperature mechanical furnaces with concentrated sulphuric acid to form alkaline sulphate and bisulphate and release HCl, cooling and absorbing the HCl in water and finally electrolyzing this solution to produce chlorine and hydrogen.

Consequently, the conventional process which, starting from alkali-metal chlorine and mineral acid, leads to chlorine gas and alkali-metal salt turns out to be complex and expensive, involving among other things the use of the concentrated mineral acids, high attack temperatures, and various successive processing stages.

In the production of alkali nitrates through chemical treatments of the corresponding chlorides with nitric acid, chlorine is directly liberated, the purification and separation of which from other undesired gases, in particular nitrogen oxides, is rather complex and costly, without even considering the corrosion problems.

It is equally well known that the mineral alkali salts can also be obtained through neutralization of the corresponding hydroxides by mineral acids. Such alkali hydroxides can be obtained in conjunction with chlorine gas production by electrolysis of chlorides in traditional chlorine-soda electrolysis plants. The process is obviously expensive due to the high electrical-energy consumption involved, this consumption being connected with the production of the alkali hydroxides and the high degree of purification required for the electrolyte.

An object of the present invention is to obviate the above inconveniences and to insure instead the production, in a single procedure, of inorganic alkali-metal salts such as nitrates, sulphates, phosphates and fluorides of a purity corresponding to that of the chlorides and mineral acids used as the starting materials and of chlorine gas having a purity analogous to that obtained by the conventional chlorine-soda electrolysis plants but with very low electrical-energy consumptions and without the requirement of particular purification pretreatments of the electrolyte.

A further object of this invention is to provide a process of the character described permitting the use of dilute mineral acids (e.g. 47% $HN_3$, the most economically convenient type which is commercially available) with a nearly total absence of corrosion problems.

In the process according to this invention, an aqueous solution containing at least one chloride of an alkali metal and at least one strong mineral acid, such as nitric acid, sulphuric acid, phosphoric acid or hydrofluoric acid, is subjected to electrolysis at a temperature exceeding the crystallization temperature of the solution itself in such a way as to obtain chlorine at the anode, hydrogen and/or other cathodic products at the cathode and the desired inorganic alkali-metal salt by crystallization of the electrolyzed solution passing out from the cell.

The process according to this invention is based upon the original idea to carry out, in solution, the "displacement" reaction of chlorine from hydrochloric acid from the chloride molecule by means of the strong mineral acid simultaneously with the electrolytic decomposition reaction of the hydrochloric acid thus released. If the symbol Me represents the alkali metal, A represents the anion of a strong acid and e⁻ represents an electron transferred, the reaction may be schematically indicated as follows:

$$2MeCl + 2HA \rightarrow 2MeA + 2HCl$$
$$2HCl \rightarrow 2H^+ + 2Cl^-$$
$$2H^+ + 2e^- \rightarrow H_2$$
$$2Cl^- \rightarrow Cl_2 + 2e^-$$

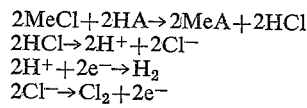

so that in a single cell the overall reaction can be shown to be:

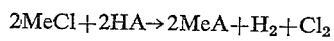

$$2MeCl + 2HA \rightarrow 2MeA + H_2 + Cl_2$$

In the case of an electrolyte containing nitric acid, cathodically produced hydrogen can be replaced, with overall reaction scheme, partly or fully by the gaseous products of reduction of nitrate ion (e.g. $NO_2$, $NO$, $N_2O$, $N_2$); thus, it is possible to obtain hydrogen-ion reduction of the $NO_3^-$ ions present in the solution. In view of the mechanism of the process involved, the decomposition voltage as applied to each element of the electrolysis cell is extremely low (i.e. equal to or less than that developed in electrolyzers for HCl at identical concentrations of $H^+$ and $Cl^-$ ions in the electrolyte, temperatures and current densities). The lower current densities result from a major contribution to the conductivity of the electrolyte by the presence of dissociated alkali-metal salts and to possible secondary exothermic reactions (e.g. the nitrate-ion reduction effected by $H^+$). With current densities of from 5 to 20 a./dm.² (amperes per square decimeter), decomposition potentials comprised between 1.0 and 2.5 v. will be obtained in the several cases.

The range of alkali-metal chloride concentrations within which the electrolysis may be carried out, may vary from 5% to 30% (by weight) depending upon the product it is desired to obtain and hence upon the mineral acid employed.

Correspondingly the operating temperatures vary from a minimum depending on the salt concentration of the solution to be electrolyzed to a maximum which may be about 90° C. but which depends both on the chemical corrosion and the vapor pressure of the acids and consequently also on their concentrations, as well as the electrical current output.

The effective concentration of the acids is very variable and expressed as hydrogen ion concentration ranges, depending on the type of the acid used, from a minimum of 0.05–0.06% to a maximum of 0.7–0.8% by weight.

At the anodes (consisting of graphite plates, suitably shaped and slotted, plates of other suitable conductive material resistant to corrosion by the electrolyte and chlorine, or including a graphite grit filling), there is a development of gaseous chlorine having a purity, after washing, which is analogous to that obtainable in the usual mercury cathode type chlorine-soda electrolysis cells.

At the cathodes, consisting of similar materials and resistance to corrosion developed by the electrolyte in the reducing environment while being adapted to provide a low overvoltage with respect to the generation of the cathodic gas, there is normally a development of gaseous hydrogen (and/or nitrogen oxides in the case of electrolyte containing nitric acid) having a purity after water washing corresponding to that obtainable in the usual diaphragm-type chlorine-soda electrolysis cells.

As compared with the hydrogen produced in the mercury cathode cells, hydrogen produced according to the process of the present invention affords the advantage of not containing any trace of mercury vapors, this being a notoriously dangerous or poisonous element for catalysts used in connection with several syntheses in which hydrogen is used.

In a preferred embodiment of the process according to this invention, we use a diaphragm-type bipolar electrode cell with a plurality of elements arranged side by side and traversed in series by the current but connected in parallel with respect to the flow of the electrolyte; that is to say, each individual electrode operates as cathode on one face and as anode on the opposite face and conducts current from one face to the other by ohmic conductivity.

The diaphragm can be advantageously constituted of polypropylene cloth, whose resistance to corrosive activity is excellent and whose ionic permeability is very good.

The solution leaving the cell should consist of such a composition as to insure, after evaporation of any excess water (introduced into the cycle with the mineral acid or in any other manner whatsoever, or after simple cooling of the electrolyte, a total or partial crystallization only of the desired alkali-metal salt, thus avoiding the crystallization of the corresponding alkali-metal chloride still present in the solution. Consequently, the electrolyte composition should lie within the phase-diagram field in which precipitation of the desired alkali-metal salt occurs and not precipitation of sodium chloride.

While the crystallized alkali metal salt is separated in the most suitable manner (centrifugation, filtering, sedimentation, etc.), washed, neutralized if necessary and dried (depending upon requirements and according to the usual processing procedures), the residual solution (mother liquor) is returned to the cell, after restoration to the initial electrolyte composition by addition of appropriate quantities of the alkali-metal chloride, mineral acid and water, and after heating if necessary. Chlorine gas produced at the anode is washed and conveyed to the usual utilization station and the same is done with hydrogen (and/or nitrogen oxides in the case of electrolytes containing $HNO_3$) developed at the cathode.

In the event of electrolysis of solutions containing nitric acid, at the cathode, as already mentioned, selectively various gaseous producs ($H_2$, $N_2$, $N_2O$, NO, etc.) depending upon the nature of the cathodic material, its form, electrolysis temperature, applied voltage, current density and the composition of the electrolyzed solution can be obtained. From an economic and industrial standpoint, it is of particular interest to obtain as cathodic products $H_2$ and NO.

Thus, for example, by electrolyzing solutions having the following composition range, in percent by weight:

| | Percent |
|---|---|
| $HNO_3$ | 5–25 |
| MeCl | 10–30 |
| $MeNo_3$ | 0–10 |
| $H_2O$ | 85–35 | at temperatures comprised between 40° and 90° C. (Me being an alkali metal), with a current density of 5–20 a./dm.$^2$ and anodes consisting of graphite plates or of graphite grit, platinum or platinum plated cathodes, or cathodes made out of low $H_2$ overvoltage metals or alloys (e.g. Duriron) are used when $H_2$ should be obtained; when NO of high purity is required, graphite-grit cathodes are preferred, whereas differently shaped cathodes of plate graphite and other materials are used to obtain nitrogen, $N_2O$, and mixtures having a different composition of $H_2$, $N_2$ and nitrogen oxides.

When producing NO gas, the latter has after alkaline washing, a very high purity and can be used as is, for special operations or converted, by oxidation with oxygen and absorption into dilute acid, into nitric acid of mean concentration (60–65%) or, operating under pressure, into nitric acid of high concentration (98–99%) intended for sale or are simply to be recycled after oxidation, the only consumption of nitric acid being in this case the quantity needed for the displacement reaction of the alkali-metal chloride.

The process according to this invention lends itself obviously to the production of various mixtures in all possible proportions of one or more alkali-metal salts of strong mineral acids starting from aqueous solutions containing in suitable proportions mixtures of alkali-metal chlorides and/or mixtures of the corresponding mineral acids depending upon the desired product.

Further characteristis and advantages of the process according to this invention will become apparent from the examples provided hereinafter.

*Example No. 1*

Production of potassium sulphate, chlorine gas and hydrogen.

As the mineral acid, sulphuric acid was used.

The electrolysis was carried out with 1000 kg. of a solution having the following composition range, in percent by weight:

| | |
|---|---|
| KCl | 15–19 |
| $K_2SO_4$ | 9–13 |
| $H_2SO_4$ | 12–16 |
| $H_2O$ | 64–52 |

The electrolysis was carried out between a plate-graphite or graphite-grit anode and a cathode consisting of platinum, or platinum plated metal, smooth or slotted graphite, or graphite grit, using a polypropylene cloth diagphragm.

The working temperature was maintained between 65° and 75° C. The current efficiency was between 90 and 96% and the voltage was 1.8–2.5 v. The gaseous products were chlorine and hydrogen of high purity, produced after the respective washing operations in quantities of 35 kg. of $Cl_2$ and 0.9 kg. of $H_2$ per metric ton of electrolyzed solution. Upon completion of the electrolysis, about 964 kg. of solution was obtained having the following composition range, in percent by weight:

| | |
|---|---|
| KCl | 8–12 |
| $K_2SO_4$ | 18–22 |
| $H_2SO_4$ | 8–12 |
| $H_2O$ | 66–54 |

The solution, upon cooling combined with evaporation at 40° C., separates a potassium sulphate precipitate. It is possible to obtain approximately 70–90 kg. of potassium sulphate per 1000 kg. of the initial solution. The chlorine and hydrogen gases after washing, are delivered to the respective utilization stations, whilst the mother liquor, from which the precipitate has been removed, is regenerated or restored to the initial concentrations by addition of the suitable quantities of KCl, $H_2SO_4$ and water.

By similarly electrolyzing a solution having an identical composition but derived from KCl of the fertilizing type (i.e. with a low content of $K_2O$), a potassium sulphate is obtained which is substantially of the same degree of purity (fertilizing grade $K_2SO_4$).

By using as the chloride-ion source sodium chloride whether of refined or standard type and operating in the same manner an anhydrous or partially hydrated sodium sulphate, depending upon the operation conditions, will be recovered.

*Example No. 2*

Production of a potassium nitrate, chlorine gas and nitrogen monoxide.

As the mineral acid, nitric acid was used. The electrolysis was carried out on 1000 kg. of a solution having the following composition range in percent by weight:

| | |
|---|---|
| $HNO_3$ | 18–22 |
| KCl | 16–20 |
| $KNO_3$ | 7–8 |
| $H_2O$ | 59–50 |

The electrolysis was carried out between graphite-grit electrodes using a polypropylene diaphragm. The current density was 10–15 a./dm.$^2$, the working temperature was 60°–80° C., the decomposition voltage was 1.6–1.9 v. The current efficiency was 94–96%.

The gaseous products are chlorine and NO of a high purity after the respective appropriate washing operations. Starting from 1000 kg. of solution approximately 35 kg. of chlorine and 10 kg. of nitrogen monoxide are obtained.

Upon completion of the electrolysis 955 kg. of solution has been obtained having the following composition range, in percent by weight:

| | |
|---|---|
| $HNO_3$ | 11–13 |
| KCl | 10–12 |
| $KNO_3$ | 18–20 |
| $H_2O$ | 61–55 |

The solution was concentrated by evaporation under vacuum at a low temperature which was however sufficiently high to avoid the premature crystallization of the salt. After evaporation of a quantity of water equal to 80–110 kg., a new solution was obtained which by cooling at 40°–45° C. separated 100–110 kg. of potassium nitrate per 1000 kg. of the original solution subjected to electrolysis.

Chlorine and NO gases obtained during the electrolysis were washed separately and then conveyed to the respective utilization stations.

NO can be oxidized with oxygen and converted into nitric acid according to the empirical reaction:

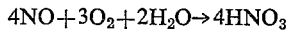
$$4NO + 3O_2 + 2H_2O \rightarrow 4HNO_3$$

In such operation, for each kg. of $NO_2$, 2.095 kg. of 100% $HNO_3$ are obtained. If the absorption of the oxidized product occurs in diluted nitric acid, one may arrive at an acid of mean concentration (60–65%) or even a higher concentration by operating under pressure.

By electrolyzing in the same manner a solution having an equal composition but derived from KCl of the fertilizing type, instead of the refined KCl conventionally used for electrolysis, a potassium nitrate of the fertilizing grade (low $K_2O$) was produced.

By using as the chloride ion source sodium chloride, whether of the refined or standard type, sodium nitrate was obtained with the equivalent sodium nitrate modalities.

*Example No. 3*

Production of sodium nitrate and chlorine and hydrogen gas.

The electrolysis was carried out on a solution having the following composition range, in percent by weight:

| | |
|---|---|
| $HNO_3$ | 8–10 |
| NaCl | 18–22 |
| $NaNO_3$ | 6–7 |
| $H_2O$ | 61–68 |

The electrolysis occurs between a graphite or a graphite-grit/anode and a cathode consisting of platinum or platinum-plated metal using a polypropylene diaphragm. Current density was of the order of 10 a./dm.$^2$.

The working temperature was 60–80° C. The resultant voltage was 2.4–2.6 v. Current efficiency was 90–95%. The gaseous products were chlorine and hydrogen of high purity after the respective washing operations.

Out of 1000 kg. of initial solution, 35 kg. of chlorine, 0.9 kg. of $H_2$ and approximately 80–100 kg. of $NaNO_3$ were obtained.

By using as chloride ion source technical or fertilizing-grade potassium chloride, a potassium nitrate was obtained having a quality corresponding to that of the starting chloride.

*Example No. 4*

Production of alkali phosphate.

As the mineral acid, phosphoric acid was used in order to principally take advantage of its first acid dissociation (i.e. $H_3PO_4 \rightarrow H^+ + H_2PO_4^-$). The electrolysis was carried out on 1000 kg. of a solution suitably prepared having the following composition range, in percent by weight:

| | |
|---|---|
| KCl | 15.0–19 |
| $KH_2PO_4$ | 8.5–12.5 |
| $H_3PO_4$ | 17.5–21.5 |
| $H_2O$ | 59.0–47.0 |

The electrolysis occurs between a graphite or a graphite-grit anode and a cathode consisting of platinum or platinum-plated metal, smooth or slotted graphite, or graphite-grit, using a polypropylene diaphragm. The working temperature was comprised between 30° and 60° C.; the voltage ranged between 1.5 and 2.5 v.; and the current density was between 10 and 20 a./dm.$^2$. The current efficiency was 90–95%.

The gaseous products were chlorine and hydrogen of high purity, after the respective washing operations, produced in the quantity of 35 kg. of chlorine and 0.9 kg. of $H_2$ per metric ton of the initial solution. Upon completion of the electrolysis, approximately 964 kg. of a solution having the following composition range, in percent by weight, was obtained:

| | |
|---|---|
| KCl | 8–12 |
| $KH_2PO_4$ | 23–27 |
| $H_3PO_4$ | 8–12 |
| $H_2O$ | 61–49 |

By cooling this solution to 20°–30° C., a saline precipitate was obtained having a mean $P_2O_5$ titre of 50–52%, and a $K_2O$ titre of 33–34% by weight. Such compositions correspond to those of monopotassium phosphate. By this technique it was possible to obtain 100–140 kg. of monopotassium phosphate. Using fertilizing-grade potassium chloride a monopotassium phosphate of an equivalent grade was obtained.

By using as the chloride-ion source sodium chloride, anhydrous and hydrated monosodium phosphate could be obtained depending upon operating conditions.

We claim:

1. A process for the direct and simultaneous production of alkali-metal nitrates, chlorine, hydrogen and nitrogen oxides comprising the steps of:
   electrolyzing in an electrolytic cell, between an anode and a cathode, an aqueous solution containing at least one alkali-metal chloride and nitric acid at a temperature exceeding that of crystallization of said solution to obtain chlorine at the anode and hydrogen and nitrogen oxides at the cathode;

crystallizing alkali-metal nitrate from the electrolyzed solution of the cell; and separating the crystallized alkali-metal nitrate from the electrolyzed solution.

2. The process defined in claim 1, further comprising the step of concentrating the electrolyzed solution from said cell prior to the crystallization of said alkali-metal nitrate to a point at which substantially only said alkali-metal nitrate will crystallize during the crystallization step.

3. The process defined in claim 1 wherein said cell is provided with a series of spaced-apart bipolar electrodes separated by diaphragms of polypropylene cloth and defining a plurality of cell elements effecting respective electrolysis operations upon the electrolyte, said process further comprising the steps of passing electric current through said cell elements in series, and passing said solution through said cell elements in parallel.

4. The process defined in claim 1 wherein at least one of said anodes and said cathode is composed of graphite grit.

5. The process defined in claim 1 wherein said cathode has at least a surface portion constituted by a metal having a low hydrogen overvoltage.

References Cited by the Examiner

FOREIGN PATENTS

| | | |
|---|---|---|
| 346,470 | 4/1931 | Great Britain. |
| 838,704 | 6/1960 | Great Britain. |

JOHN H. MACK, *Primary Examiner.*

MURRAY TILLMAN, L. G. WISE, H. M. FLOURNOY,
*Assistant Examiners.*